United States Patent
Rajendran et al.

(10) Patent No.: US 10,423,749 B2
(45) Date of Patent: Sep. 24, 2019

(54) SYSTEM, METHOD AND COMPUTER-ACCESSIBLE MEDIUM FOR PROVIDING SECURE SPLIT MANUFACTURING

(71) Applicant: New York University, New York, NY (US)

(72) Inventors: Jeyavijayan Rajendran, Brooklyn, NY (US); Ozgur Sinanoglu, Abu Dhabi (AE); Ramesh Karri, New York, NY (US)

(73) Assignee: New York University, New York, NY (US)

( * ) Notice: Subject to any disclaimer, the term of this patent is extended or adjusted under 35 U.S.C. 154(b) by 14 days.

(21) Appl. No.: 14/775,164

(22) PCT Filed: Mar. 14, 2014

(86) PCT No.: PCT/US2014/028757
§ 371 (c)(1),
(2) Date: Sep. 11, 2015

(87) PCT Pub. No.: WO2014/153029
PCT Pub. Date: Sep. 25, 2014

(65) Prior Publication Data
US 2016/0034628 A1 Feb. 4, 2016

Related U.S. Application Data

(60) Provisional application No. 61/782,878, filed on Mar. 14, 2013.

(51) Int. Cl.
*G06F 17/50* (2006.01)
*G06F 21/75* (2013.01)

(52) U.S. Cl.
CPC ...... *G06F 17/5072* (2013.01); *G06F 17/5068* (2013.01); *G06F 17/5081* (2013.01); *G06F 21/75* (2013.01)

(58) Field of Classification Search
CPC .................................................. G06F 17/5068
(Continued)

(56) References Cited

U.S. PATENT DOCUMENTS 6,782,479 B1 * 8/2004 Williams ................ G06F 21/75
380/52
7,195,931 B2 3/2007 Jarvis et al.
(Continued)

OTHER PUBLICATIONS

"International Technology Roadmap for Semiconductors," http://www.itrs.net/Links/2011ITRS/Home2011.htm.; Year 2011.
(Continued)

*Primary Examiner* — Suchin Parihar
(74) *Attorney, Agent, or Firm* — Hunton Andrews Kurth LLP

(57) ABSTRACT

Exemplary systems, methods and computer-accessible mediums can secure split manufacturing of an integrated circuit by modifying a previous location of at least one pin to a further location of the at least one pin based on a fault analysis procedure. A determination of the further location can include an iterative procedure that can be a greedy iterative procedure. The modification of the location of the at least one partition pin can be performed by swapping at least one further partition pin with the at least one partition pin.

24 Claims, 10 Drawing Sheets

(58) Field of Classification Search
USPC .......................................................... 716/103
See application file for complete search history.

(56) References Cited

U.S. PATENT DOCUMENTS

| | | | | |
|---|---|---|---|---|
| 7,281,233 | B1* | 10/2007 | Sivasubramaniam | ...................... G06F 17/5054 716/105 |
| 8,082,138 | B1* | 12/2011 | Bakshi | ................ G06F 17/5045 703/14 |
| 8,788,955 | B2* | 7/2014 | Quine | ........................... 715/763 |
| 9,501,603 | B2* | 11/2016 | Barowski | ............ G06F 17/5077 |
| 9,502,356 | B1* | 11/2016 | Parvarandeh | ......... H01L 23/544 |
| 9,735,781 | B2* | 8/2017 | Cocchi | ............. H03K 19/17736 |
| 2004/0102019 | A1* | 5/2004 | Jarvis | ...................... H01L 22/20 438/455 |
| 2007/0099236 | A1* | 5/2007 | Bickford | ............. G06F 17/5081 435/7.1 |
| 2007/0138657 | A1* | 6/2007 | Condorelli | .......... H01L 23/5383 257/787 |
| 2007/0204252 | A1 | 8/2007 | Furnish et al. | |
| 2008/0022235 | A1* | 1/2008 | Chew | .................. G06F 17/5068 716/56 |
| 2008/0111558 | A1* | 5/2008 | Sharma et al. | ................ 324/537 |
| 2008/0178139 | A1 | 7/2008 | Pfeil et al. | |
| 2009/0254874 | A1 | 10/2009 | Bose | |
| 2010/0225380 | A1* | 9/2010 | Hsu | ........................ H01L 23/576 327/514 |
| 2010/0301903 | A1* | 12/2010 | Cocchi | ................... H03K 19/20 326/122 |
| 2011/0153288 | A1* | 6/2011 | Bhattacharya | ...... G06F 17/5077 703/2 |
| 2011/0153289 | A1* | 6/2011 | Bhattacharya | ...... G06F 17/5077 703/2 |
| 2011/0154276 | A1* | 6/2011 | Bhattacharya | ...... G06F 17/5077 716/100 |
| 2012/0054699 | A1* | 3/2012 | Cho et al. | ...................... 716/102 |
| 2012/0089956 | A1 | 4/2012 | Bakshi et al. | |
| 2012/0190133 | A1* | 7/2012 | Abou-Khalil et al. | ............ 438/4 |
| 2014/0032156 | A1* | 1/2014 | Sanyal et al. | .................. 702/119 |
| 2015/0286544 | A1* | 10/2015 | Kadri | ................... G06F 11/2043 714/13 |
| 2016/0034694 | A1* | 2/2016 | Rajendran | ................. G09C 1/00 713/190 |
| 2016/0070840 | A1* | 3/2016 | Barowski | ............. G06F 17/5077 716/126 |
| 2016/0197616 | A1* | 7/2016 | Cocchi | ................. G06F 17/5068 326/41 |
| 2016/0224407 | A1* | 8/2016 | Rajendran | ........... G06F 17/5068 |
| 2016/0341786 | A1* | 11/2016 | Pileggi | ............... G01R 31/2818 |
| 2017/0103236 | A1* | 4/2017 | Homayoun, Jr. | ....... G06F 21/87 |
| 2018/0342468 | A1* | 11/2018 | Rajendran | ............. H01L 23/573 |

OTHER PUBLICATIONS

Digitimes Research, "Trends in the global IC design service market;" http://www.digitimes.com/Reports/Report.asp?datepublish=2012/3/13&pages=RS&seq=400 &read=toc.; Year 2012.

Intelligence Advanced Research Projects Activity, "Trusted Integrated Circuits Program," https://www.fbo.gov/utils/view?id=b8be3d2c5d5babbdffc6975c370247a6.; Year 2011.

J. Roy, F. Koushanfar, and I. Markov, "Epic: Ending Piracy of Integrated. Circuits," Proc. of Design, Automation and Test in Europe, pp. 1069-1074, 2008.

R. Chakraborty and S. Bhunia, "Harpoon: An Obfuscation-Based SoC Design Methodology . . . Protection," IEEE Transactions on Comp-Aided Design, vol. 28, No. 10, pp. 1493-1502, 2009.

Semi, "Innovation is at risk as semiconductor equipment and materials industry loses up to $4 billion annually due to IP infringement," www.semi.org/en/Press/P043775, 2008.

"FreePDK45:Metal Layers," http://www.eda.ncsu.edu/wiki/FreePDK45 : Metal_Layers. Year 2007.

N. Selvakkumaran and G. Karypis, "Multi objective hypergraph partitioning . . . subdomain-degree minimization," IEEE Trans on Comp-Aided Design of Integrated Cir and Sys, 2006.

Cadence, "SoC Encounter," http://www.cadence.com/products/di/soc_encounter/ pages/default.aspx.

H. Lee and D. S. Ha, "Hope: An Efficient Parallel Fault Simulator for Synchronous Sequential Circuits," IEEE Transact on Comp-Aided Design, vol. 15, No. 9, pp. 1048-1058, 1996.

M. Potkonjak et al., "Hardware Trojan horse detection using gate-level characterization," Proceedings of the IEEE/ACM Design Automation Conference, pp. 688-693, 2009.

D. Agrawal et al., "Trojan Detection 15 using IC Fingerprinting," Proc. of the IEEE Symposium on Security and Privacy, pp. 296-310; 2007.

Cadence, "Virtuoso," http://www.cadence.com/products/cic/layout_suite/pages/default.aspx.

International Serach Report for International Application No. PCT/US2014/028757 dated Aug. 7, 2014.

Written Opinion for International Application No. PCT/US2014/028757 dated Aug. 7, 2014.

Rajendran et al. "Logic Encryption: A Fault Analysis Perspective" (2012).

Rajendran et al. "Is Split Manufacturing Secure?," IEEE Xplore Abstract (Jun. 30, 2014).

Torrance, Randy et al., "The State-of-the-Art in Semiconductor . . . ," Proc. of IEEE/ACM Design Automation Conference, pp. 333-338, 2011.

Sherwani, N.A., "Algorithms, for VLSI Physical Design Automation," pp. 27-29, 2002.

Bushnell, M.L. et al., "Essentials of Electronic Testing for Digital, . . . " Kluwer Academic Publishers, Boston, pp. 27-29, 2000.

Selvakkumaran, Navaratnasothie et al., "Multiobjective Hypergraph . . . ," IEEE Transaction of Computer-Aided of Inter. Circuits and Sys., vol. 25, No. 3, pp. 504-517, Mar. 2006.

Baumgarten, Alex et al., "Preventing IC Piracy Using Reconfigurable Logic Barriers," IEEE Design and Test of Computers, vol. 27, No. 1, pp. 66-75, 2010.

Jin, Yier et al., "Hardware Trojan Detection Using Path Delay Fingerprint," Proc. of IEEE Inter Sym. on Hardware-Oriented Security and Trust, pp. 51-57, 2008.

Narasimhan, Seetharam et al., "Multiple-Parameter Side-Channel Analysis: A . . . ," Proc. of the IEEE Inter. Sym. in Hardcore-Oriented Security and Trust, pp. 13-18, 2010.

* cited by examiner

| Layer | Pitch (nm) |
|---|---|
| M10 | 1600 |
| M9 | 1600 |
| M8 | 800 |
| M7 | 800 |
| M6 | 280 |
| M5 | 280 |
| M4 | 280 |
| M3 | 140 |
| M2 | 140 |
| M1 | 130 |
| Poly | 125 |

SYSTEM, METHOD AND COMPUTER-ACCESSIBLE MEDIUM FOR PROVIDING SECURE SPLIT MANUFACTURING

CROSS-REFERENCE TO RELATED APPLICATIONS

This application relates to and claims the benefit and priority from International Patent Application No. PCT/US2014/028757 filed on Mar. 14, 2014, which claims the benefit and priority from U.S. Provisional Application No. 61/782,878 filed on Mar. 14, 2013, the entire disclosures of which are incorporated herein by reference.

FIELD OF THE DISCLOSURE

The present disclosure relates generally to split manufacturing, and more specifically, to exemplary systems, methods, and computer-accessible mediums for providing and/or securing split manufacturing.

BACKGROUND INFORMATION

Integration of digital, analog, radio frequency, photonic and other devices into a complex System on Chip ("SoC") is generally well known and has been previously demonstrated. (See, e.g., Reference 1). More recently, sensors, actuators, and biochips are also being integrated into these already powerful SoCs. SoC integration has been facilitated by advances in mixed system integration and the increase in the wafer sizes (e.g., currently about 300 mm and projected to be 450 mm by year 2018), which has resulted in a reduction in the cost per chip of such SOCs. (See, e.g., Reference 1). However, support for multiple capabilities, and mixed technologies, has increased the cost of ownership of advanced foundries. For instance, the cost of owning a foundry will be approximately $5 billion in year 2015. (See e.g., 15 Reference 2). Consequently, only large commercial foundries now manufacture such high performance, mixed system SoCs, especially at the advanced technology nodes. (See, e.g., Reference 3). Absent the economies of scale, many of the design companies cannot afford owning and acquiring expensive foundries, and therefore, outsource their design fabrication to "one-stop shop" foundries.

Globalization of Integrated Circuits ("IC") design flow has led to several security vulnerabilities. If a design can be fabricated in a foundry that may not be under the direct control of the fabless design house, attacks such as reverse engineering, malicious circuit modification and Intellectual Property ("IP") piracy can be possible. (See, e.g., Reference 3). An attacker, anywhere in the design flow, can reverse engineer the functionality of an IC/IP, and then steal and claim ownership of the IP. An untrusted IC foundry can overbuild ICs and sell them illegally. Additionally, rogue elements in the foundry can insert malicious circuits (e.g., hardware trojans) into the design without the designer's knowledge. (See, e.g., References 4 and 5). Due to these attacks, the semiconductor industry loses approximately $4 billion annually. (See, e.g., Reference 6).

Certain fabless semiconductor companies, such as Advanced Micro Devices, Inc. ("AMD") and research agencies, such as Intelligence Advanced Research Projects Agency ("IARPA") have proposed split manufacturing to thwart such attacks. (See, e.g., References 3; 8). In split manufacturing, the layout of the design can be split into the Front End Of Line ("FEOL") layers and Back End Of Line ("BEOL") layers which can then be fabricated separately in different foundries. The FEOL layers can consist of transistors and other lower metal layers (e.g., $\leq M4$) and the BEOL layers can consist of the top metal layers (e.g., $>M4$). Post fabrication, the FEOL, and BEOL wafers can be aligned and integrated together using either electrical, mechanical, or optical alignment techniques. The final ICs can be tested upon integration of the FEOL and BEOL wafers. (See, e.g., References 3; 8). The asymmetrical nature of the metal layers can facilitate split manufacturing. FIG. 1A shows an exemplary cross-section of IC, and FIG. 1B shows exemplary pitches of different metal layers for the 45 nm technology. (See, e.g., Reference 7). The top BEOL metal layers can be thicker and have a larger pitch than the bottom FEOL metal layers. Therefore, a designer can easily integrate the BEOL and FEOL wafers.

FIG. 2 shows an exemplary split manufacturing-aware IC design flow. A gate level netlist 205 can be partitioned 210 into blocks, which can then be floorplanned and placed. The transistors and wires inside a block can form the FEOL layers 215. The top metal wires connecting the blocks and the IO ports can form the BEOL layers 220. The BEOL 220 and FEOL 215 wires can be assigned to different metal layers and routed such that the wiring delay and routing congestion can be minimized. The layout 225 of the entire design can be split into two—one layout and can contain the FEOL layers 215, and the other layout can contain the BEOL layers 220. The two layouts can then be fabricated in two different foundries.

The fabricated FEOL 215 and BEOL layouts 220 can be obtained by a system integrator, and can then be integrated by using electrical, mechanical, or optical alignment techniques, and tested for defects. (See, e.g., Reference 8). The FEOL layout 215 can be first fabricated and then sent to a trusted second foundry where the BEOL layout 220 can be built on top of it. (See, e.g., Reference 8).

Split manufacturing can improve the security of the IC, as the FEOL and BEOL layers can be fabricated separately and combined post fabrication. This can prevent a single foundry (e.g., especially the FEOL foundry) from gaining full control of the IC. For instance, without the BEOL layers, an attacker in the FEOL foundry can neither identify the "safe" places within a circuit to insert trojans, nor pirate the designs without the BEOL layers. The economic benefit of split manufacturing can come from performing the low cost BEOL layer fabrication in-house and outsourcing the expensive FEOL layer fabrication. (See, e.g., Reference 3).

Transporting the FEOL wafers to the BEOL foundry, or transporting the FEOL and BEOL wafers to the SoC integrator, can present a challenge (e.g., these wafers can be thin and might crack or delaminate during transportation). An alignment of the FEOL and BEOL layers, and increase in die area to accommodate alignment structures, present a further challenge. Split manufacturing can also affect the signal integrity timing of the signals that span the FEOL and BEOL layers, and other design-for-manufacturability aspects. While several research projects from research agencies such as IARPA (see e.g., Reference 3) and companies such as AMD (see e.g., Reference 8) focus on addressing these challenges, and make it feasible to reap the benefits of split manufacturing, split manufacturing can be inherently insecure.

Thus, it may be beneficial to provide exemplary systems, methods and computer-accessible mediums to provided and/or secure split manufacturing, and which can address and/or overcome at least some of the deficiencies described herein above.

SUMMARY OF EXEMPLARY EMBODIMENTS

To that end, such exemplary systems, methods, and computer-accessible mediums according to exemplary embodiments of the present disclosure can be provided.

The security offered by split manufacturing can stem from the fact that the attacker in the FEOL foundry cannot determine the missing BEOL connections. A security analysis of split manufacturing can show how an attacker can determine the missing BEOL connections by using knowledge of the FEOL connections. For example, a proximity attack can exploit the vulnerabilities introduced by the physical design tools (e.g., floorplanning, placement, and routing tools). Then, the attacker can determine the missing BEOL connections and can either pirate the design or insert trojans into the design. According to one exemplary embodiment, every missing BEOL connection can be a net that connects a target pin and its corresponding candidate pin. A target pin can have many candidate pins, but the attacker can try to determine the correct candidate pin for that target pin with the following objective: If the attacker can connect every target pin with its correct candidate pin, the attacker can recover the original design. The exemplary systems, methods, and computer-accessible mediums can thwart the proximity attack by deceiving an attacker to make wrong BEOL connections. The exemplary systems, methods and computer-accessible mediums according to exemplary embodiments of the present disclosure can involve the adoption of IC testing principles (e.g., fault excitation, fault propagation, and fault masking) to swap partition pins, which can improve the security of split manufacturing.

These and other objects of the present disclosure can be achieved by provision of exemplary systems, methods and computer-accessible mediums for providing and/or securing split manufacturing of an integrated circuit which can include modifying a previous location of a partition pin(s) to a further location of the partition pin based on a fault analysis procedure. An exemplary determination can include an iterative procedure that can be, for example, a greedy iterative procedure. The modification of the location of the partition pin(s) can be performed by swapping one partition pin(s) with another partition pin(s). The determination of the partition pin(s) can be based on an effect of swapping the partition pin(s) and the further pair pin(s) on a maximum number of outputs of the integrated circuit.

In some exemplary embodiments of the present disclosure, a further pair pin(s) can be swapped based on an effect of swapping on a maximum number of outputs. In certain exemplary embodiments of the present disclosure, the determination can be based at least in part on a Hamming Distance or an Avalanche Criterion. The Hamming Distance can be approximately 50%. In some exemplary embodiments of the present disclosure, the interconnections between the partition pin(s) and the further partition pin(s) can be made at or on at least one Front End Of Line metal layer, connections inside the partition(s) can be made at or on at least one Back End Of Line metal layer, and the Front End Of Line and Back End Of Line layers are manufactured separately. In certain exemplary embodiments, an attacker can be deceived into making a wrong connection between the modified partition pin(s) based on a reverse engineered BEOL netlist with missing FEOL connections.

According to further exemplary embodiment of the present disclosure, the further location can be determined using a netlist. The further location can be identified in the netlist using a cumulative sum of corrupted output bits over a set of random test patterns.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features, and advantages of the present disclosure will become apparent from the following detailed description taken in conjunction with the accompanying Figures showing illustrative embodiments of the present disclosure, in which.

Figures 1A, 1B:
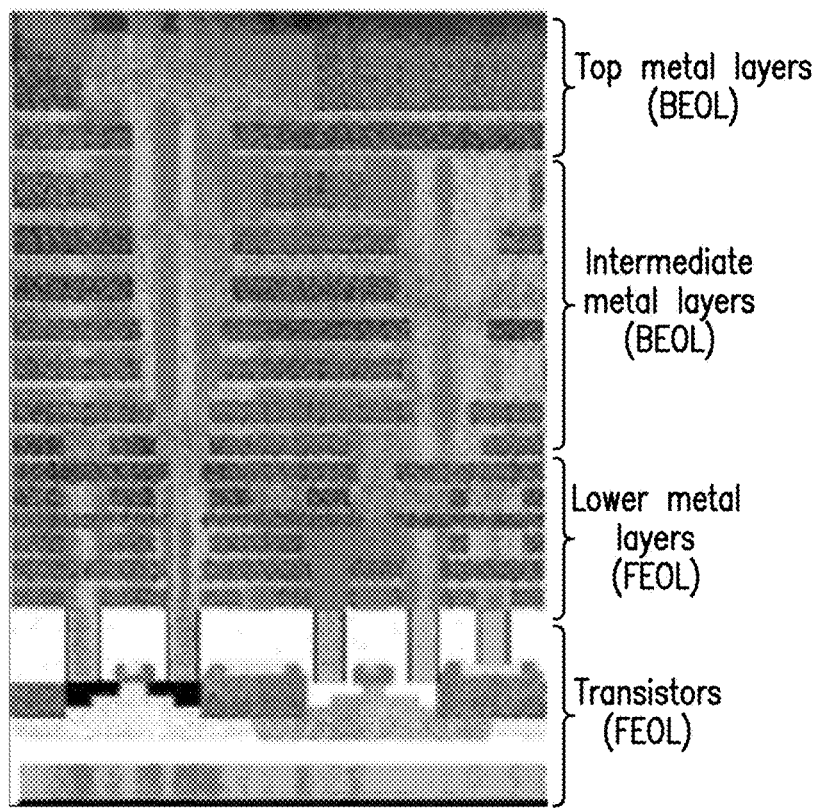
FIG. 1A is an exemplary cross-section of an exemplary conventional integrated circuit layout.
FIG. 1B is an exemplary chart of exemplary conventional pitch lengths of different metal layers in 45 nm CMOS technology.
Figure 2:
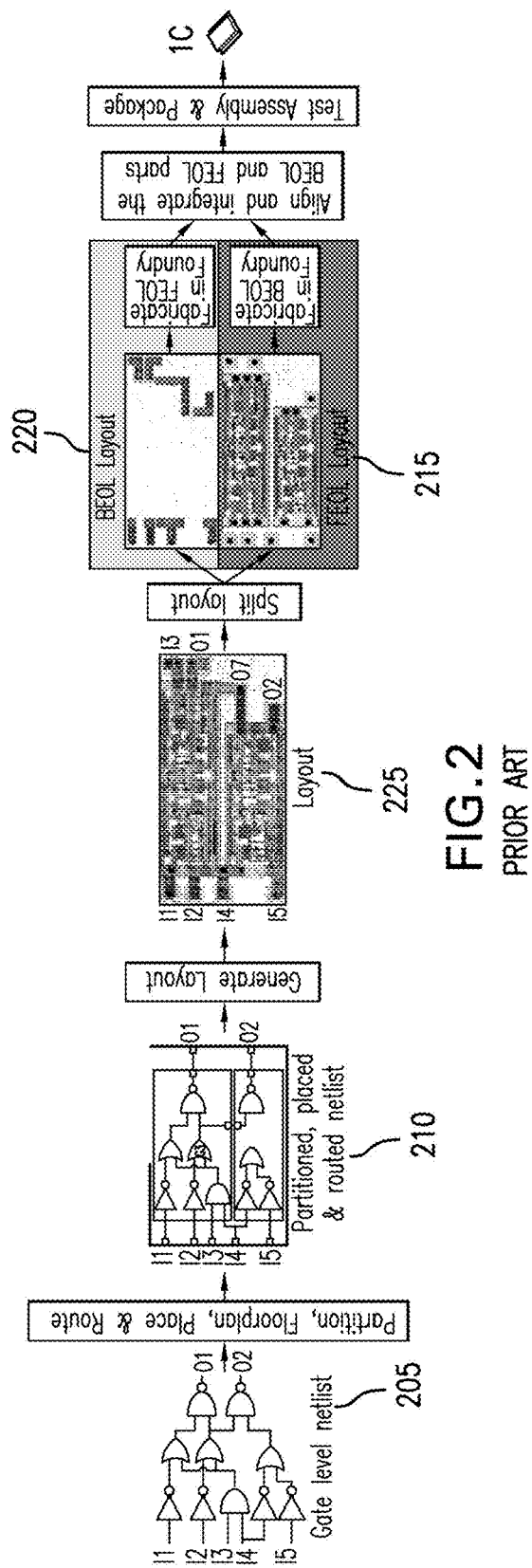
FIG. 2 is an exemplary schematic diagram of an exemplary conventional split manufacturing design flow.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the provided figures.

DETAILED DESCRIPTION

Exemplary Definitions $P_{Net,Partition,Direction}$ can denote, but is not limited to, a partition pin or an IO port.

Net can be, but is not limited to, a name of a wire in the exemplary design according to an exemplary embodiment of the present disclosure.

Partition can be, but is not limited to, partitions A or B or an IO port.

Direction of a pin can be, but is not limited to, in or out. For example, consider an exemplary net X in the original design which can connect a gate in exemplary Partition A to another gate in exemplary Partition B. The corresponding exemplary partition pins on the partition boundaries of Partition A and Partition B can be denoted as $P_{X,A,out}$ and $P_{X,B,in}$, respectively.

A target pin can be, but is not limited to, an output pin of a partition or an input port of the exemplary design according to an exemplary embodiment of the present disclosure from which a signal originates.

Figure 3:
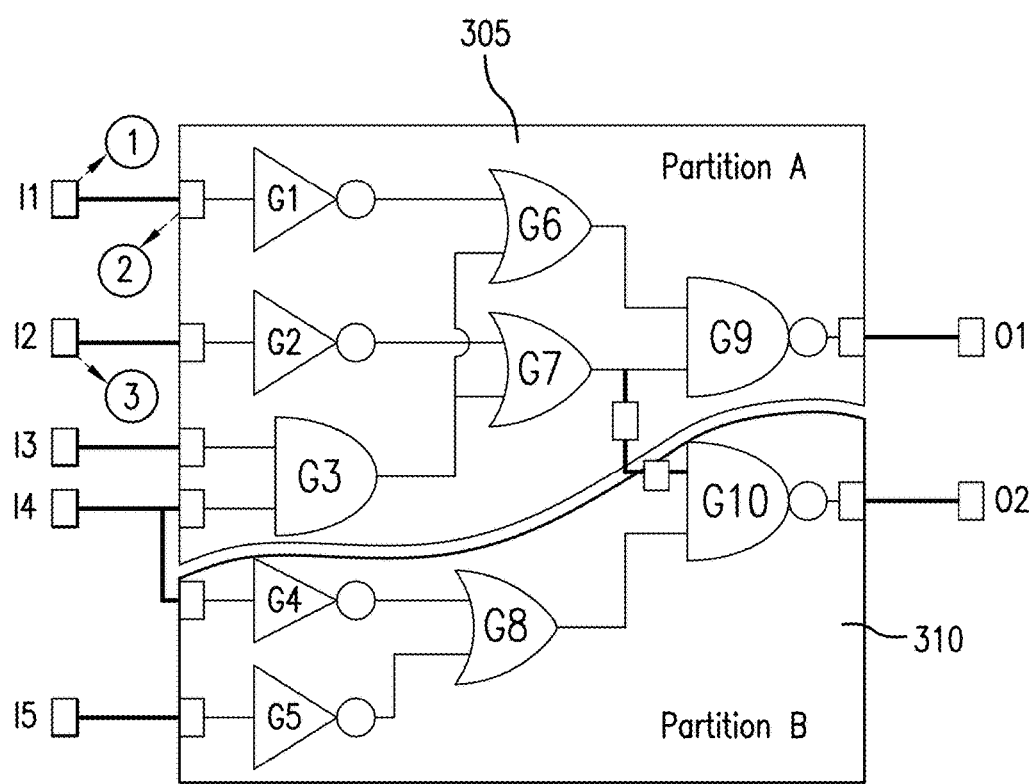
FIG. 3 is an exemplary schematic diagram of an exemplary benchmark circuit according to an exemplary embodiment of the present disclosure.

A candidate pin can be, but is not limited to, an input pin of a partition or an output port of the design at which a signal terminates. For example, FIG. 3 shows an exemplary C17 circuit. Pin $P_{I1,IO,in}$ can be the target pin and pin $P_{I1,A,in}$ can be its corresponding candidate pin. A target pin in a partition can be swapped with another pin in the same partition referred to as swapping pin. In FIG. 3, pin $P_{I2,IO,in}$ can be the swapping pin for target pin $P_{n,Io,in}$.

Exemplary Security Analysis

Exemplary Threat Model

An attacker can be in an offshore foundry that manufactures the FEOL part. Since the attacker can have the GDSII layout file of the design, the attacker can reverse engineer it, and obtain the gate-level netlist. Such reverse engineering techniques have been previously demonstrated. (See, e.g., Reference 9). The attacker in the FEOL foundry can gain knowledge about most of the design (e.g., the transistors and the lower metal layers) except for the missing BEOL connections. Once the attacker determines these missing BEOL connections, the attacker can reconstruct the original design.

For example, FIG. 3 shows a schematic diagram of an exemplary ISCAS-85 combinational logic benchmark circuit, C17. This exemplary design can have five inputs (I1-I5) and two outputs (O1, O2). Such exemplary circuit be separated into two partitions—Partition A (305) and Partition B (310). Partition A (305) can have three inputs (e.g., G1, G2, and G3) and two outputs (e.g., G7 and G9). Partition B (310) can have two inputs (e.g., G4 and G5) and one output (e.g., G10). The wires within a partition (e.g., local wires except Vdd and clock) can be assigned to lower metal layers. The wires that span the partitions and I/O ports can be assigned to higher metal layers. This exemplary scheme can make the routing easier. (See, e.g., Reference 10). The nets can connect the input ports I1-I5 to the corresponding inputs of the gates G1-G5, and can use the BEOL layers. The nets can connect the output of gates G9 and G10 to output ports O1 and O2, respectively, and can use the BEOL layers. The net that connects the output of G7 to one of the inputs of G10 can also use the BEOL layer.

Exemplary Proximity Attack

An exemplary attack can be based on the heuristic that floorplanning and placement ("F&P") tools can place the partitions close by, and orient the partitions so as to reduce the wiring (e.g., delay) between the pins to be connected. (See e.g., Reference 10). This heuristic of most F&P tools can constitute a security vulnerability that can be exploited by an attacker in the FEOL foundry who does not have access to the BEOL layers.

For example, consider a target pin, $P_{X,A,out}$, and its corresponding candidate pin, F&P tools can attempt to place $P_{X,A,out}$ closer to $P_{X,B,in}$ than to any other partition pin in Partition B. An attacker can then recover the netlist of the original design by connecting every target pin to its closest candidate pin. This can be referred to as a proximity attack. This attack can use the hints provided by the F&P tools that will be explained below:

Exemplary Hint 1—Input-output relationships: An input partition pin (e.g., candidate pin) can be connected either to an output pin of another partition or to an input port of the IC (e.g., target pin). Input partition pins can be connected to the poly layer and output partition pins can emanate from the diffusion layer.

Consider the partition pin $P_{I1,A,in}$ of the partitioned F&P C17 benchmark circuit in FIG. 3. This can be an input pin for Partition A. For example, this pin can be connected only to pins $P_{I1,IO,in}$, $P_{I2,IO,in}$, $P_{I3,IO,in}$, $P_{I4,IO,in}$, $P_{I5,IO,in}$, and $P_{G10,B,out}$, in, e.g., reducing the possible candidate pins from 10 to 6.

Exemplary Hint 2—Unique inputs per partition: A net in an exemplary design can be connected to only one input pin of a partition. If a net acts as an input for multiple gates within that partition, for example, the fan-out node can be placed within the partition that it feeds into.

Figure 4B:
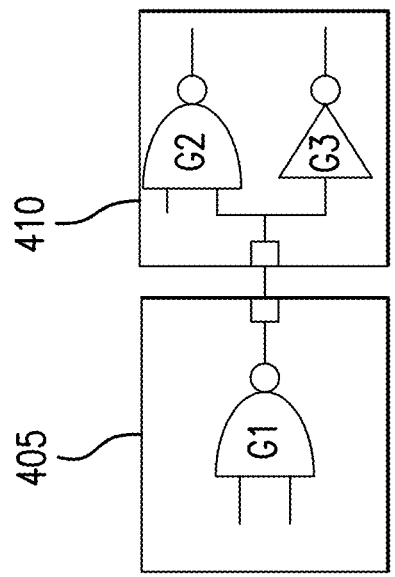
FIGS. 4A and 4B are exemplary schematic diagram of an exemplary fan-out push performed by F&P tools according to an exemplary embodiment of the present disclosure.
Figure 4A:
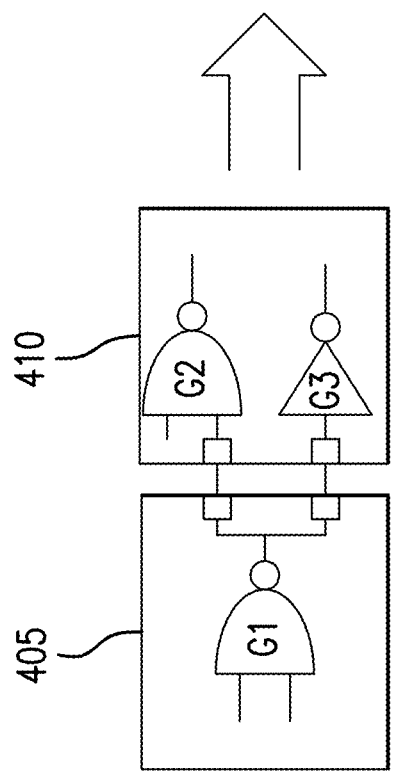

Consider the exemplary partitions in FIG. 4. For example, partition A (405) can have two output pins $P_{G1,A,out1}$ and $P_{G1,A,out2}$ and Partition B (410) can have two input pins $P_{G1,B,in1}$ and $P_{G1,B,in2}$. On pushing the fan-out node into Partition B (410), as shown in FIG. 4B, the number of input and output pins in Partition A (405) and Partition B (410), respectively, can be reduced by one. This observation can reduce the number of possible connections from $2^{N^2}$ to N! for N missing connections, as every target pin can have a unique candidate pin.

Exemplary Hint 3—Combinational loops: With the exception of ring oscillators, flip-flops, and latches, combinational loops can be rare in a design. Further, ring oscillators, flip-flops, and latches can be contained within a single partition, and can be easily identifiable due to their standard structure. Therefore, an attacker does not need to consider a pin as a candidate pin if it forms a combinational loop with the target pin.

Consider the exemplary partitions in FIG. 3. After connecting the target pin $P_{G7,A,out}$ to candidate $P_{G7,B,in}$, an attacker may not have to consider the output pin $P_{GIO,B,out}$ as a possible candidate pin for the target pins P12,A,1n, P13,A,in, and P14,A,in because PG1o,B,out can form a combinational loop when connected to any one of these pins.

An attacker can find the correct candidate pin for a target pin by identifying the closest pin from the list of possible candidate pins. As discussed above, this heuristic can be based on the fact that F&P tools try to place two partition pins, which can be connected by a BEOL layer, as close as possible to each other to reduce the wiring overhead. Thus, an attacker can connect the two closest pins in different partitions hoping that F&P tools have placed them close to each other.

Consider the exemplary locations of partition pins and the IO ports of the F&P C17 benchmark, as shown in Table 1 below. Consider, for example, the input port $P_{I1,IO}$, in which is connected to pin $P_{I1,A,in}$ in partition A. The locations of $P_{I1,IO,in}$ and $P_{I1,A,in}$ can be (0,6) and (1,6), respectively. The exemplary distance between these two pins can be 1 unit. Next, consider another exemplary input port $P_{I3,IO,in}$. The exemplary distance between $P_{I3,IO,in}$ and $P_{I1,A,in}$ can be 1.414 units. Thus, the closest exemplary possible pin to $P_{I1,A,in}$ can be $P_{I1,IO,in}$. Therefore, an attacker can connect these two pins in the netlist and obtain the missing BEOL connection. Similarly, an attacker can connect all the other partition pins with their closest pins and reconstruct the original exemplary design.

TABLE 1

X-Y coordinates of the exemplary pins in partitions A and B and IO ports of F&P C17 design. The coordinates can be shown as absolute units for ease of understanding.

| Partition A | | Partition B | | Input & Output | |
|---|---|---|---|---|---|
| Pin | XY location | Pin | XY location | Port | XY location |
| $P_{I1,A,in}$ | (1, 6) | $P_{I4,B,in}$ | (1, 2) | $P_{I1,IO,in}$ | (0, 6) |
| $P_{I2,A,in}$ | (9, 5) | $P_{I5,B,in}$ | (1, 0) | $P_{I2,IO,in}$ | (10, 6) |
| $P_{I3,A,in}$ | (1, 5) | $P_{G7,B,in}$ | (7, 2) | $P_{I3,IO,in}$ | (0, 5) |
| $P_{I4,A,in}$ | (1, 4) | $P_{G10,B,out}$ | (7, 0) | $P_{I4,IO,in}$ | (0, 4) |
| $P_{G9,A,out}$ | (9, 4) | | | $P_{I5,IO,in}$ | (0, 0) |
| | | | | $P_{O1,IO,out}$ | (10, 5) |
| | | | | $P_{O2,IO,out}$ | (8, 0) |

Exemplary Attack Procedure

---

Input: FEOL layers
Output: Netlist with BEOL connections
1   Reverse engineer FEOL layers and obtain the partitions;
2   while Unassigned partition pins or ports exist do
3       Select an arbitrary unassigned input pin or an output port as a TargetPin;
4       List Of Candidate Pins = BuildCandidatePinsList(TargetPin);
5       Select CandidatePin from List OfCandidatePins that is closest to TargetPin;
6       Connect TargetPin and CandidatePin;
7       Update netlist;
8   End
9   Return netlist;
10  
11  BuildCandidatePinsList(TargetPin)
Input: TargetPin $P_{X,I,in}$
Output: Candidate pins for TargetPin
12  CandidatePins = Unassigned output pins of other partitions + unassigned input ports of the design;
13  For each PinJ∈CandidatePins do
14      if CombinationalLoop(TargetPin, PinJ) then
15          CandidatePins −= PinJ;
16      end
17  end
18  Return CandidatePins;
19

---

Exemplary Procedure 1: Proximity Attack on Split Manufacturing

Exemplary Procedure I described herein can illustrate the procedures involved in the proximity attack. The input to the procedure can be the FEOL layer information, and the goal can be to reconstruct the netlist by identifying the missing BEOL connections. The procedure can choose an arbitrary TargetPin from the unassigned partition input pins and output ports, create its list of possible CandidatePins, and connect it to the closest pin in this list. The netlist can then be updated. This procedure can be repeated until all the missing connections can be made. Candidate pins for a target pin can be chosen based on the exemplary hints above. After executing this procedure, the attacker can obtain the missing BEOL connections and, consequently, the original design.

Exemplary Systems, Methods and Computer Accessible Medium for Providing and/or 5 Securing of Split Manufacturing The exemplary systems, methods and computer-accessible mediums, according to exemplary embodiments of the present disclosure, can overcome a proximity attack by rearranging the partition pins such that a pin $P_{X,A,out}$ can no longer be the closest pin to $P_{X,B,in}$. An attacker performing proximity attack can be deceived into making the wrong BEOL connections (e.g., $P_{X,B,in}$ can be connected with $P_{Y,A,out}$ instead of $P_{X,A,out}$).

Consider the exemplary F&P C17 circuit of FIG. 3. Before swapping, pin $P_{G7,A,out}$ can be close to pin $P_{G7,B,in}$. Therefore, an attacker can connect the two pins together. If the pins $P_{G7,A,out}$ and $P_{G9,A,out}$ are swapped, then $P_{G9,A,out}$ can be close to $P_{G7,B,in}$. Therefore, an attacker can connect these two pins, thereby making a wrong connection.

According to the exemplary systems, methods and computer-accessible mediums, a sufficient number of pins have to be swapped such that the functionality of the deceiving netlist differs from that of the original netlist. This functional difference can be quantified by the exemplary Hamming distance between the outputs of the original netlist and the deceiving netlist. If it can be 0%, then the attacker can retrieve the original design. If it can be 100%, then the attacker can retrieve the design that can be the exact complement of original design. Therefore, the Hamming distance should be approximately 50% where a different set of the outputs can be corrupted for different input vectors, although larger and smaller Hamming distances can be used. A designer can stop swapping pins when the Hamming distance between the outputs of the original netlist and the deceiving netlist reaches about 50%. Finding, for example, the best rearrangement for N pins of a partition can take N!, computations and this can be computationally expensive. Thus, the exemplary systems, methods and computer-accessible mediums, according to exemplary embodiments of the present disclosure, can utilize pair-wise swapping of pins (e.g., pair-wise swapping of pins results in $O(N^2)$ computations).

There can be constraints, however, on pin swapping. Not all pins can be swapped with all other pins. The target pin and swapping pin together should pass a basic test presented as hints in the previous section. Otherwise, the attacker can omit it from further consideration. Therefore, for a target pin, a swapping pin can, for example

- be an output pin of the partition where the target pin resides,
- not be connected to the partition where the candidate pin resides, and not form a combinational loop with a candidate pin on connecting with it.

Exemplary Integrated Circuit Testing for Split Manufacturing

To determine a swapping pin for a target pin, similar to an attacker, the defender can build the list of candidate pins for that target pin. Then, the defender can randomly select the swapping pin from that list. Unfortunately, such random selections may not guarantee that the attacker can get a wrong output on making a wrong connection. Therefore, the exemplary systems, methods and computer-accessible mediums according to exemplary embodiments of the present disclosure, can use IC testing principles (see, e.g., Reference 12), to select the swapping pin for a target pin in order to achieve the 50% Hamming distance objective.

Exemplary Scenario 1—Commutativity: For example, consider the scenario where the swapping pin and the target pin can be the two inputs of the same gate that implements a commutative operation, and neither of them acts as an input of any other gate. On swapping these two pins, the logical functionality can remain the same despite the wrong connection.

Exemplary Scenario 2—Fault activation: Logical exemplary values at the swapping pin and target pin can differ for most of the input patterns. If their logical values can be the same for most of the input patterns, then the resulting design, even with wrong connections, can still produce mostly correct outputs. This can be similar to fault activation in IC testing where, in order to detect a stuck-at-fault at a node, the node can be justified to the value that can be the opposite of the stuck-at value. (See, e.g., Reference 12). Thus, a pin that can have a logical value opposite to that of the target pin for most of the input patterns can be selected as the swapping pin.

Figure 5A:
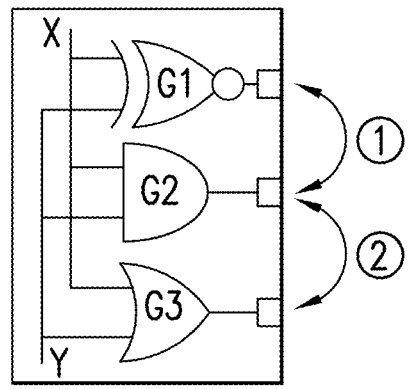
FIG. 5A is an exemplary schematic diagram of an exemplary pin that has a logical value opposite to that of an exemplary swapped pin according to an exemplary embodiment of the present disclosure.

FIG. 5A shows an exemplary illustration of an exemplary pin that has a logical value opposite to that of an exemplary swapped pin. If $P_{G1,A,out}$ can be selected as the swapping pin for target pin $P_{G2,A,out}$, the logical values at the pin can differ when X=Y=O. If $P_{G3,A,out}$ can be selected as the swapping pin for target pin $P_{G2,A,out}$, the logical values at the pins can differ in two cases: X=1, Y=0 and X=O, Y=1. Thus, $P_{G3,A,out}$ can be preferred over $P_{G1,A,out}$.

Exemplary Scenario 3—Fault propagation: Pins can be swapped such that a wrong value activated by the swap can easily propagate to one or more outputs and corrupt them. If the swapping pin results in a wrong value which does not propagate to one or more outputs, then that swap can be ineffective. This can be similar to the fault propagation concept in IC testing where the effect of a fault can propagate to one or more outputs for detection. (See, e.g., Reference 12). Thus, pins can be swapped such that the effect of swapping propagates to one or more outputs.

Figure 5B:
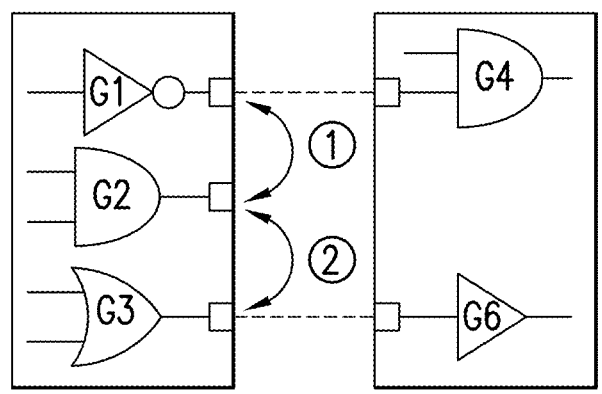
FIG. 5B is an exemplary schematic diagram indicating how a wrong value can propagate through an integrated circuit according to an exemplary embodiment of the present disclosure.

FIG. 5B shows an exemplary illustration of a schematic that indicates how a wrong value can propagate through an integrated circuit. For example, if $P_{G1,A,out}$ can be selected as the swapping pin for $P_{G2,A,out}$, the wrong value can propagate only when the other input of G4 can be 1. However, if $P_{G3,A,out}$ can be selected as the swapping pin, the buffer, G5, can propagate the wrong value. Thus, $P_{G3,A,out}$ can be preferred over $P_{G1,A,out}$.

Exemplary Scenario 4—Fault masking: Logical values can be corrupted by swapping pins in partition A, and can be restored to their original value because of swapping pins in partition B. This can be similar to fault masking in IC testing where the effect of one fault can be restored by the effect of another fault. (See e.g., Reference 12).

Figure 5C:
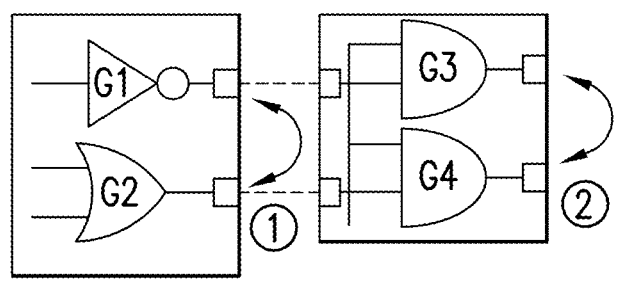
FIG. 5C is an exemplary schematic diagram of an exemplary cancellation of logical errors introduced in an integrated circuit according to an exemplary embodiment of the present disclosure.

For example, FIG. 5C shows an exemplary illustration of a schematic that indicates an exemplary logical error introduced in an integrated circuit. The logical error introduced by swapping $P_{G1,A,out}$ and $P_{G2,A,out}$ can be canceled by swapping $P_{G3,B,out}$ and $P_{G4,B,out}$. Thus, random selection of a swapping pin may not guarantee a wrong output for an attacker while increasing the wire length for the defender. Therefore, the exemplary systems, methods and computer-accessible mediums, according to exemplary embodiments of the present disclosure, can employ judicious swapping techniques based on fault analysis.

Exemplary Procedure 2: Fault Analysis-Based Swapping of Pins to Thwart Proximity Attack

```
Input: Partitions
Output: List of target and swapping pins
1    ListofTargetPins = φ
2    ListofSwappingPins = φ
3    ListofUntouchedPins = All partition pins and I/O ports;
4    while Untouched output partition pins or input ports exist do
5        For each UntouchedPin do
6            SwappingPins =BuildSwappingPinsList(UntouchedPin);
7            For each SwappingPin∈SwappingPins do
8                Compute FaultImpact_{UntouchedPin,SwappingPin}
9            End
10       End
11       Find the TargetPin and SwappingPin with the highest Fault Impact from its
         SwappingPins;
12       ListofTargetPins += TargetPin;
13       ListofSwappingPins += SwappingPins;
14       ListofUntouchedPins -= TargetPin;
15       ListofUntouchedPins -= SwappingPin;
16       Swap TargetPin and SwappingPin;
17       Update netlist;
18   End
19   Return ListofTargetPins and ListofSwappingPins;
20   
21   BuildSwappingPinsList(TargetPin);
     Input: TargetPinP_{X,I,out}
     Output: SwappingPins for TargetPin
22   SwappingPins = Other untouched output pins in partition 'i';
23   For each PinJ∈SwappingPins do
24       if CombinationalLoop(TargetPin, PinJ) then
```

```
25        SwappingPins -= PinJ;
26    End
27  End
28  Return SwappingPins;
29
```

Exemplary Defense: Fault-Analysis Based Pin Swapping

Instead of randomly selecting the swapping pin, the pin that affects, for example, most of the outputs for most of the input patterns on swapping can be selected. This can account for fault activation, propagation, and masking scenarios. The exemplary systems, methods and computer-accessible mediums can define the fault impact metric to select a swapping pin Y for a target pin X, $$\text{Fault impact}_{X,Y} = \sum_{i=1}^{\# \text{ of test patterns}} \# \text{ of corrupted outputs}$$

For example, the target pin X can be swapped with the swapping pin Y in the netlist and can be identified by the cumulative sum of the corrupted output bits over a set of random test patterns. A fault impact can quantify the effect of swapping on the outputs of the design.

Pins can be swapped based on the fault impact metric as shown in Procedure 2 described herein. For an untouched pin (e.g., all output partition pins and input ports), a list of swapping pins, SwappingPins, can be built and/or generated using the exemplary "BuildSwappingPinsList" procedure. Fault impact metric can be used to select the swapping and target pins. The selected pins can then be swapped and the netlist can be updated. The above steps can be repeated until all the partition pins and input ports can be swapped, or the Hamming distance value reaches 50%.

Exemplary Results

The exemplary systems, methods, and computer-accessible mediums can be evaluated using ISCAS-85 combinational benchmark circuits. Each circuit can be partitioned into two partitions using the hMETIS tool. (See, e.g., Reference 13). Floorplanning, placement, and routing can be performed using Cadence SoC Encounter tool (see, e.g., Reference 14) for 45 nm CMOS technology. The exemplary location of the partition pins and JO ports can be obtained using the same tool. The HOPE fault simulation tool can be utilized (see, e.g., Reference 15) to calculate the fault impact metric by applying 1000 random input patterns. The Hamming distance between the output of the original design and the design reconstructed using the proximity attack technique can be determined by applying 1000 random input patterns. The defender can stop swapping pins once the defender reaches the 50% Hamming distance between the original netlist and the deceiving netlist constructed by swapping pins. In case of designs where 50% Hamming distance is not achieved, the defender can swap all the pins.

Figure 6:
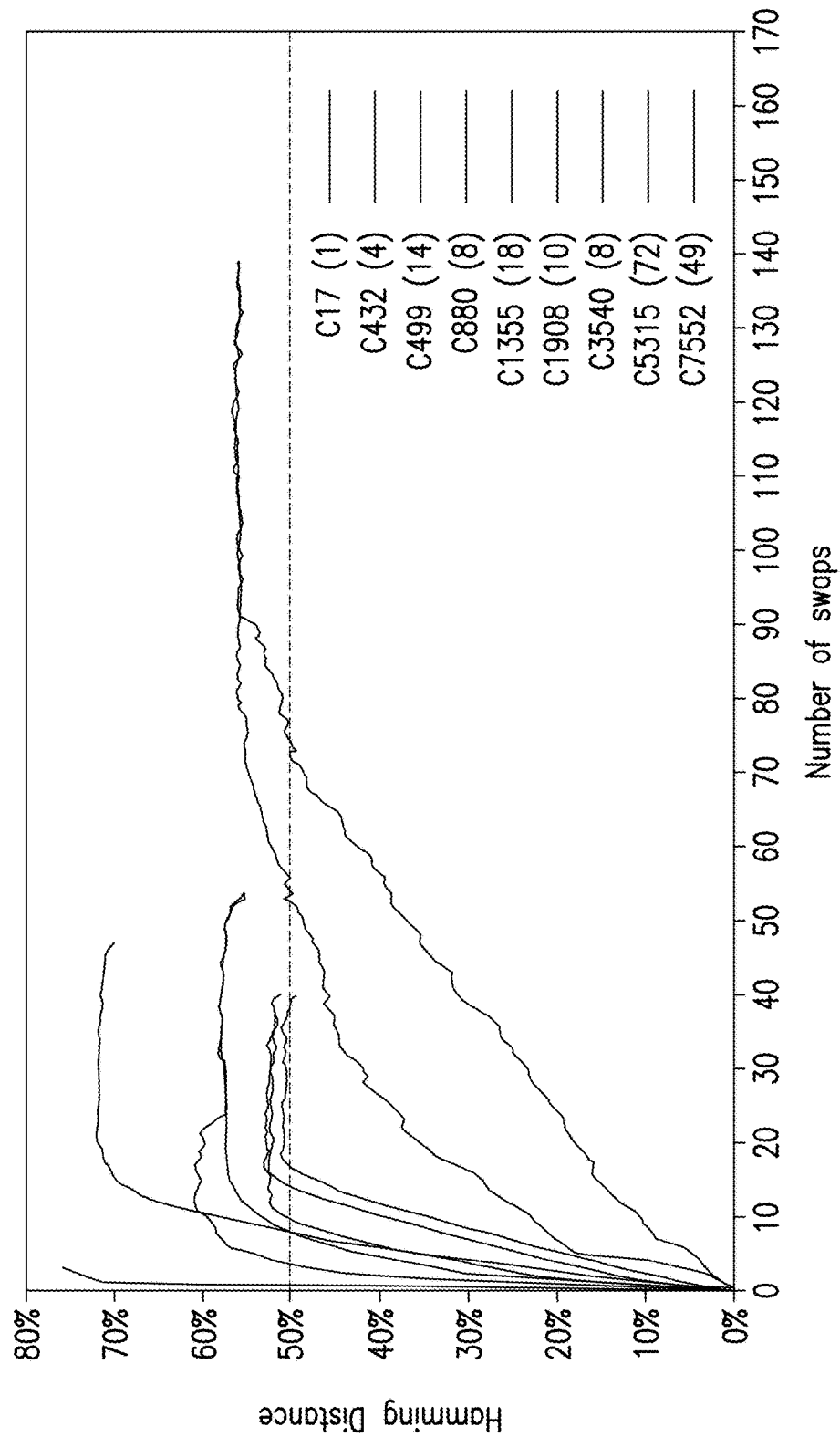
FIG. 6 is a graph illustrating an exemplary Hamming distances according to an exemplary embodiment of the present disclosure.

One of the purposes of swapping pins can be to ensure that an attacker, on performing a proximity attack, reconstructs an incorrect design (e.g., the reconstructed design produces wrong outputs for most of the inputs). The Hamming distance metric not only quantifies the tendency of a design to produce a wrong output, but can also quantify how many output bits can be corrupted. FIG. 6 illustrates an exemplary graph providing exemplary Hamming distances between the outputs of the original design and the deceiving netlist obtained after swapping partition pins based on the exemplary fault analysis.

Different benchmark circuits can have different numbers of partition pins. Thus, according to one example, only a limited number of swaps can be possible in a circuit. In addition, based on the order of swapping, for example, some partition pins may not have candidate pins. For instance, some of the swapping pins can form a combinational loop with the candidate pin, leaving no swapping possibilities.

Fault analysis-based swapping can achieve at least 50% Hamming distance for all the benchmarks. This can be because it can account for the fault activation, propagation, and masking effects in pin-swap selections. Furthermore, the curves can be steep in fault analysis-based swapping. This can indicate that fault analysis-based swapping can take a small number of swaps to achieve the 50% Hamming distance mark.

Figure 7:
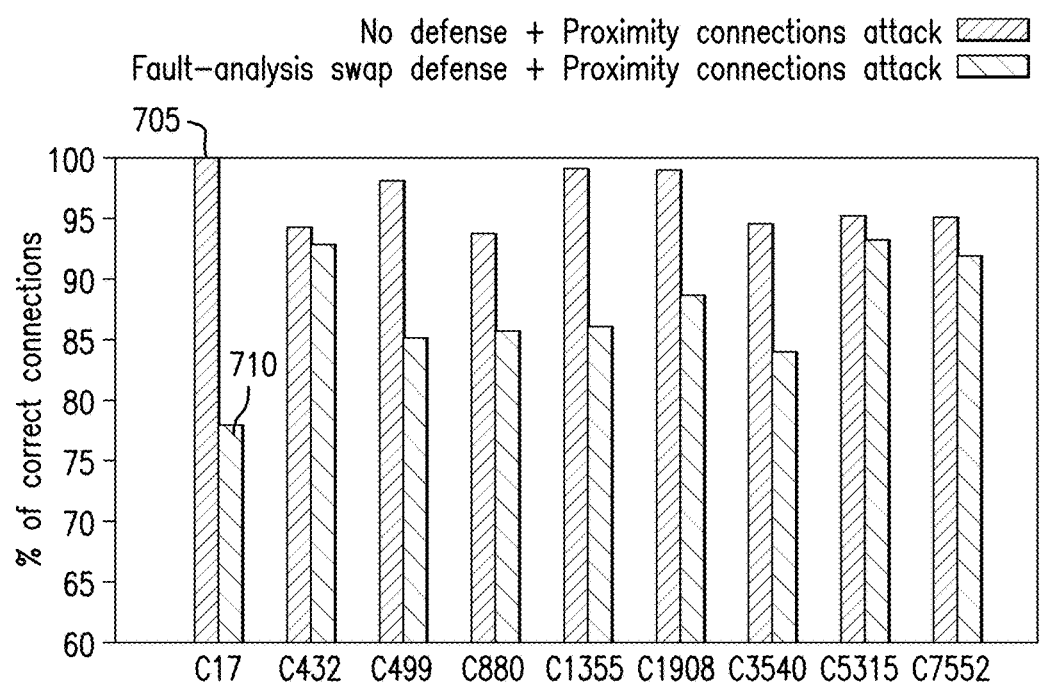
FIG. 7 is a graph of an exemplary percentage of partition pins and ports that are correctly connected by an attacker using a proximity attack.

An attacker can try to make as many correct connections as possible. The number of correct connections in a design reconstructed by the attacker can determine the effectiveness of the proximity attack. FIG. 7 illustrates an exemplary graph of an exemplary percentage of partition pins and JO ports that are correctly connected by an attacker using a proximity attack. In case of "No defense+Proximity connections attack" (705), for example, the average number of correct connections can be 96%. In case of the exemplary C17 benchmark, the attacker can make all the connections correctly. This verifies that F&P tools place pins, which can be connected in BEOL, closer to each other and can indicate that straightforward split manufacturing can be easily compromised. In case of "Fault-analysis swap defense+Proximity connections attack" (710), the attacker can connect 87% of the pins correctly because only a small number of pins were swapped; for most of the designs, at most 20 pins can be swapped. However, the effectiveness of the remaining 13% of wrong connections is provided in more detail below.

Figure 8:
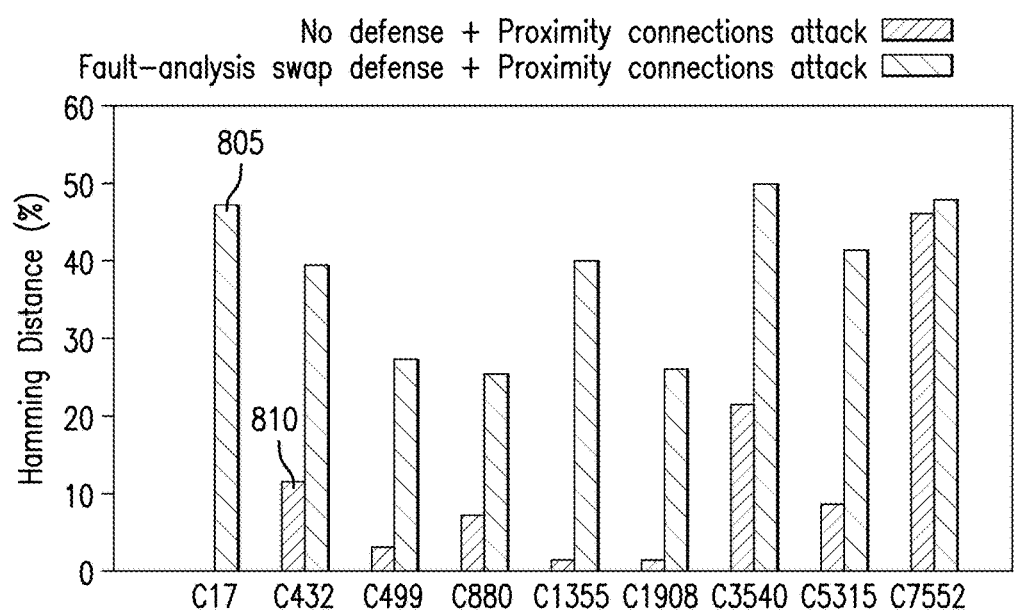
FIG. 8 is a graph of an exemplary Hamming distances between outputs according to exemplary embodiments of the present disclosure.

Exemplary Defense Metric: Hamming Distance of Designs Reconstructed by the Attacker FIG. 8 illustrates a further exemplary graph of exemplary Hamming distances between outputs of the original design and the design reconstructed using a proximity attack. When a proximity attack can be performed, the exemplary Hamming distance between the outputs of the original and reconstructed designs can reduce, which can highlight the effectiveness of the proposed attack. This can be particularly evident in the case where no defenses are used.

In case of "No defense+Proximity connections attack" (805), the average Hamming distance can be around 10% except for C7552 circuit. In this circuit, there can be more I/O ports shared between the two partitions and can be placed at equidistant locations. This can prevent the attacker from making the correct connections, which can result in a higher exemplary Hamming distance. However, for most of the benchmark circuits, the Hamming distance value of the design reconstructed by the attacker can be less than 6%. Thus, an attacker can almost determine the functionality of the design correctly using this attack. Consequently, the attacker can obtain a design which can be almost an equivalent to the original design. Therefore, a defense to this type of an attack can be beneficial.

The exemplary systems, methods, and computer-accessible mediums, according to exemplary embodiments of the present disclosure can achieve an exemplary Hamming distance that can be close to the 50% Hamming distance objective. This can be illustrated by swapping a limited, but an effective, set of pins, a designer can obtain a secure design. The average Hamming distance for "Fault analysis swap defense+Proximity connections attack" (810) technique can be 42%. This can be slightly less than the desired 50% Hamming distance because the fault-analysis based defense may not consider the proximity of the swapping and target pins. For example, the exemplary defense can place the swapping pin closer to the candidate pin than the target pin. However, there can be some other pin, apart from the swapping and target pins that can be closer to the candidate pin. Thus, an attacker can connect the candidate pin with this pin instead of the swapping pin that the defender had in mind. Nevertheless, employing the exemplary systems, methods, and computer-accessible mediums can improve the exemplary Hamming distance significantly.

Using the percentage of correct connections as a metric for a defense can be a fallacy. This can be evident from the exemplary C3540 circuit. For example, the "Fault-analysis swap defense+Proximity connections attack" (710) is shown in FIG. 7. In FIG. 7, for example, it is indicated that the attacker can make 85% of connections correctly a using proximity attack. Consider the same case in FIG. 8. Here, the fault analysis based defense achieves 50% Hamming distance. Thus, a small number of wrong connections can be enough to corrupt a majority of the output bits.

Thus, the exemplary number of correct connections made can be a good metric to analyze an attack technique because the objective of an attacker can be to get a greater number of correct connections. Conversely, the exemplary Hamming distance between the outputs of the original design, and the design constructed by performing an attack, can be a good metric to analyze a defense because the objective of the defender can be to deceive an attacker into making wrong connections such that a large number of wrong outputs can be obtained.

Figure 10:
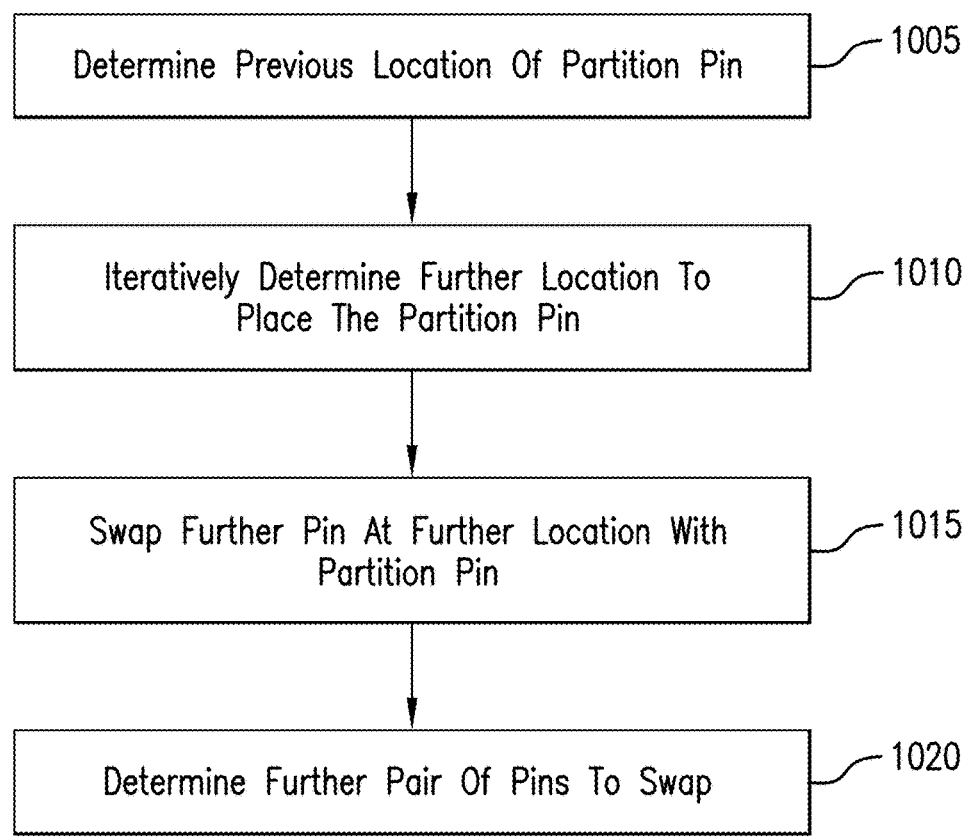
FIG. 10 is an exemplary flow diagram of a method for providing or securing split manufacturing of an Integrated Circuit according to an exemplary embodiment of the present disclosure.

FIG. 10 illustrates an exemplary flow chart of a method for providing and/or securing split manufacturing of an IC. At procedure 1005, a previous location of a partition pin can be determined. At procedure 1010, a further location can be determined using, for example, an iterative procedure that can be a greedy iterative procedure. At procedure 1015, the pin at the previous location can be swapped with the pin at the further location. At procedure 1020, a further pair of pins can be located and swapped.

EXEMPLARY CONCLUSION

Split manufacturing may not be a universal solution for all security problems. It can protect commercial designs from rogue elements in the FEOL foundry. However, an attacker can use the objective of F&P tools to undermine the security benefits offered by split manufacturing. When no defense is applied in conjunction with split manufacturing, the attacker can make 96% of the missing BEOL connections correctly.

The exemplary systems, methods and computer-accessible mediums can increase the wire-length, noise, and reduce signal integrity, and illustrates that only a small set of pins (<20 for most designs) have to be swapped to achieve, for example, the 50% Hamming distance metric. For high-performance designs, one can easily constrain the exemplary systems, methods, and computer-accessible mediums to consider pins on the critical path. Even though the exemplary systems, methods, and computer-accessible mediums have been demonstrated using only two partitions, one can easily extend them to multiple partitions. Apart from swapping pins, one can also partition the design, determine the aspect-ratios, and orient the partition blocks with an objective to overcome proximity attack. The floorplanning, placement, and routing tools can also be empowered with security heuristics.

Figure 9:
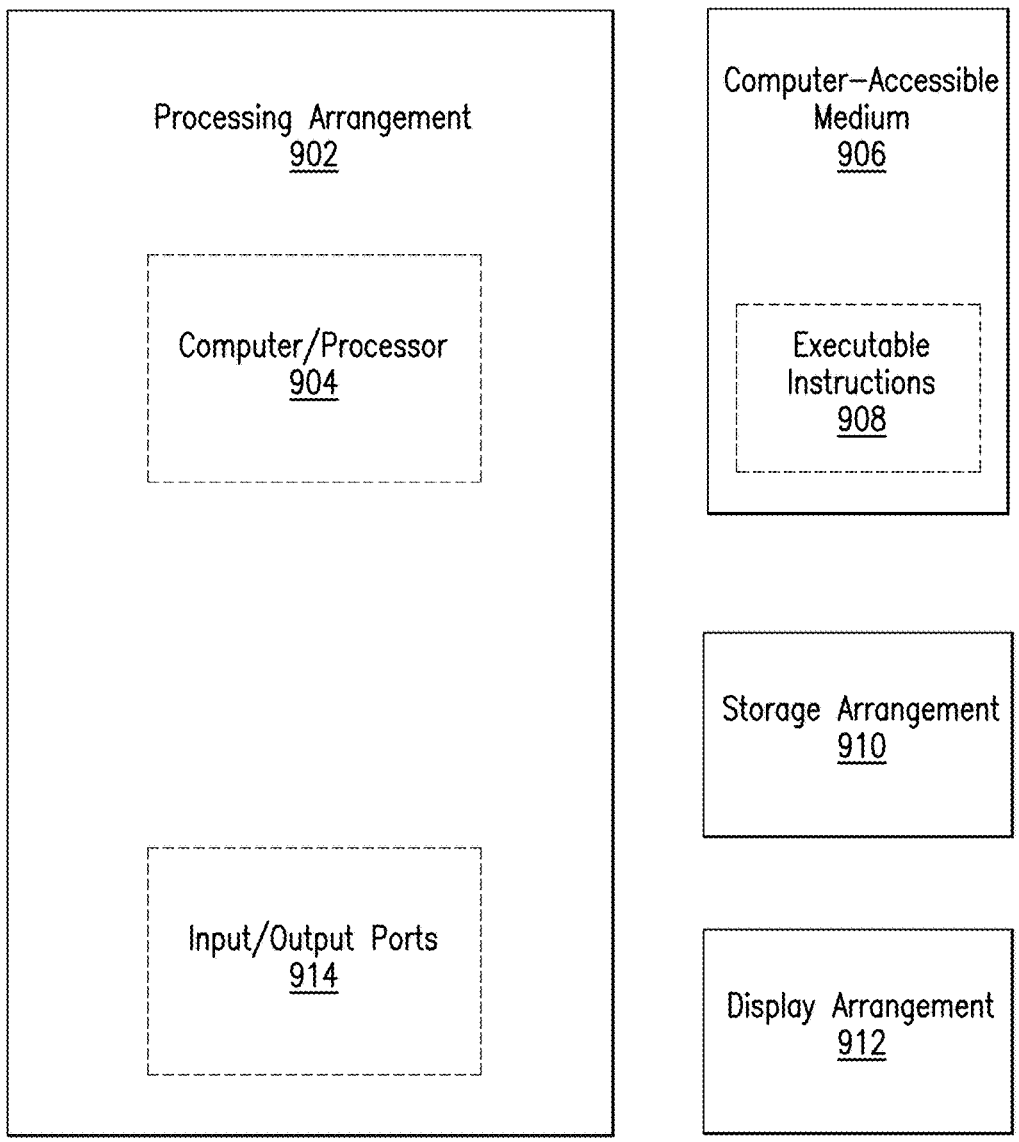
FIG. 9 is a block diagram of an exemplary system in accordance with certain exemplary embodiments of the present disclosure.

FIG. 9 shows a block diagram of an exemplary embodiment of a system according to the present disclosure. For example, exemplary procedures in accordance with the present disclosure described herein can be performed by a processing arrangement and/or a computing arrangement 902. Such processing/computing arrangement 902 can be, e.g., entirely or a part of, or include, but not limited to, a computer/processor 904 that can include, e.g., one or more microprocessors, and use instructions stored on a computer-accessible medium (e.g., RAM, ROM, hard drive, or other storage device).

As shown in FIG. 9, e.g., a computer-accessible medium 906 (e.g., as described herein above, a storage device such as a hard disk, floppy disk, memory stick, CD-ROM, RAM, ROM, etc., or a collection thereof) can be provided (e.g., in communication with the processing arrangement 902). The computer-accessible medium 906 can contain executable instructions 908 thereon. In addition or alternatively, a storage arrangement 910 can be provided separately from the computer-accessible medium 906, which can provide the instructions to the processing arrangement 902 so as to configure the processing arrangement to execute certain exemplary procedures, processes and methods, as described herein above, for example.

Further, the exemplary processing arrangement 902 can be provided with or include an input/output arrangement 914, which can include, e.g., a wired network, a wireless network, the interne, an intranet, a data collection probe, a sensor, etc. As shown in FIG. 9, the exemplary processing arrangement 902 can be in communication with an exemplary display arrangement 912, which, according to certain exemplary embodiments of the present disclosure, can be a touch-screen configured for inputting information to the processing arrangement in addition to outputting information from the processing arrangement, for example. Further, the exemplary display 912 and/or a storage arrangement 910 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entirety.

[1] "International Technology Roadmap for Semiconductors," http://www.itrs.net/Links/2011ITRS/Home2011.htm.
[2] DIGITIMES Research, "Trends in the global IC design service market," http://www.digitimes.com/Reports/Reportasp?datepublish=2012/3/13&pages=RS&seq=400&read=toc.
[3] Intelligence Advanced Research Projects Activity, "Trusted Integrated Circuits Program," https://www.fbo.gov/utils/view?id=b8be3d2c5d5babbdffc6975c370247a6.
[4] J. Roy, F. Koushanfar, and I. Markov, "EPIC: Ending Piracy of Integrated. Circuits," *Proc. of Design, Automation and Test in Europe*, pp. 1069-1074, 2008.
[5] R. Chakraborty and S. Bhunia, "HARPOON: An Obfuscation-Based SoC Design Methodology for Hardware Protection," *IEEE Transactions on Computer-Aided Design*, vol. 28, no. 10, pp. 1493-1502, 2009.
[6] SEMI, "Innovation is at risk as semiconductor equipment and materials industry loses up to $4 billion annually due to IP infringement," www.semi.org/en/Press/PO43775, 2008.
[7] "FreePDK45:Metal_Layers," http://vvww.eda.ncsu.edu/wiki/FreePDK45:Metal_Layers.
[8] R. Jarvis and M. G. McIntyre, "Split manufacturing method for advanced semiconductor circuits," U.S. Pat. No. 7,195,931, 2004.
[9] R. Torrance and D. James, "The state-of-the-art in semiconductor reverse engineering," *Proc. of IEEE/A CM Design Automation Conference*, pp. 333-338, 2011.
[10] N. A. Sherwani, "Algorithms for VLSI Physical Design Automation," 2002.
[11] Cadence, "Virtuoso," http://www.cadence.com/products/cic/layout_suite/pages/default.aspx.
[12] M. L. Bushnell and V. D. Agrawal, "Essentials of Electronic Testing for Digital, Memory, and Mixed-Signal VLSI Circuits," Kluwer Academic Publishers, Boston, 2000.
[13] N. Selvakkumaran and G. Karypis, "Multiobjectivehypergraph-partitioning algorithms for cut and maximum subdomain-degree minimization," *IEEE Transactions on Computer-Aided Design of Integrated Circuits and Systems*, 2006.
[14] Cadence, "SoC Encounter," http://www.cadence.com/products/di/soc_encounter/pages/default.aspx.
[15] H. Lee and D. S. Ha, "HOPE: An Efficient Parallel Fault Simulator for Synchronous Sequential Circuits," *IEEE Transactions on Computer-Aided Design*, vol. 15, no. 9, pp. 10. 1048-1058, 1996.
[16] A. Baumgarten, A. Tyagi, and J. Zambreno, "Preventing IC Piracy Using Reconfigurable Logic Barriers," *IEEE Design and Test of Computers*, vol. 27, no. 1, pp. 66-75, 2010.
[17] D. Agrawal, S. Baktir, D. Karakoyunlu, P. Rohatgi, and B. Sunar, "Trojan Detection 15 using IC Fingerprinting," *Proc. of the IEEE Symposium on Security and Privacy*, pp. 296-310, May 2007.
[18] Y. Jin and Y. Makris, "Hardware Trojan detection using path delay fingerprint," *Proc. of IEEE International Symposium on Hardware-Oriented Security and Trust*, pp. 51-57, 2008.
[19] M. Potkonjak, A. Nahapetian, M. Nelson, and T. Massey, "Hardware Trojan horse detection using gate-level characterization," *Proceedings of the IEEE/ACM Design Automation Conference*, pp. 688-693, 2009.
[20] S. Narasimhan, D. Dongdong, R. Chakraborty, S. Paul, F. Wolff, C. Papachristou, K. Roy, and S. Bhunia, "Multiple-parameter side-channel analysis: A non-invasive hardware Trojan detection approach," *Proc. of the IEEE International Symposium on Hardware-Oriented Security and Trust*, pp. 13-18, 2010.

What is claimed is:

1. A non-transitory computer-accessible medium having stored thereon computer-executable instructions for providing or securing split manufacturing of an integrated circuit ("IC"), wherein, when a computer hardware arrangement executes the instructions, the computer arrangement is configured to perform procedures comprising:
receiving information related to a design of the IC;
determining at least one first partition pin in the design located at a first location and at least one second partition pin in the design located at a second location to be swapped based on a fault analysis procedure that identifies at least one IC output, wherein the at least one first partition pin and the at least one second partition pin are interconnected with one another based on at least one metal layer; and
swapping the at least one first partition pin with the at least one second partition pin in the design.

2. The computer-accessible medium of claim 1, wherein the computer arrangement is further configured to determine the second location using an iterative procedure.

3. The computer-accessible medium of claim 2, wherein the iterative procedure comprises a greedy iterative procedure.

4. The computer-accessible medium of claim 1, wherein the computer arrangement is further configured to determine the second location based on an effect of swapping the at least one first partition pin and the at least one second partition pin on a maximum number of outputs of the IC.

5. The computer-accessible medium of claim 1, wherein the computer arrangement is further configured to determine at least one further pair of pins to swap based on an effect of the swapping as a function of a maximum number of outputs.

6. The computer-accessible medium of claim 1, wherein the computer arrangement is further configured to determine the second location based, at least in part, on a Hamming Distance.

7. The computer-accessible medium of claim 6, wherein the Hamming Distance is approximately 50% between a plurality of outputs of an original netlist of the design and a deceiving netlist of the design.

8. The computer-accessible medium of claim 1, wherein the computer arrangement is further configured to determine the second location based, at least in part, on an Avalanche Criterion.

9. The computer-accessible medium of claim 1, wherein the at least one metal layer is at least one Front End Of Line (FEOL) metal layer, wherein connections inside at least one partition are made on at least one Back End Of Line (BEOL) metal layer, and wherein the at least one FEOL and the at least one BEOL layers are manufactured separately.

10. The computer-accessible medium of claim 1, wherein the computer arrangement is further configured to determine the second location using a netlist.

11. The computer-accessible medium of claim 10, wherein the computer arrangement is further configured to identify the second location in the netlist using a cumulative sum of corrupted output bits over a set of random test patterns.

12. The computer-accessible medium of claim 1, wherein the computer arrangement is further configured to deceive an attacker into making at least one wrong connection between at least one of the at least one first partition pin or the at least one second partition pin based on a reverse engineered Back End Of Line (BEOL) netlist with missing Front End Of Line (FEOL) connections.

13. The method of claim 1, wherein the second location is determined based, at least in part, on at least one of a Hamming Distance or an Avalanche Criterion.

14. The method of claim 13, wherein the Hamming Distance is approximately 50% between a plurality of outputs of an original netlist of the design and a deceiving netlist of the design.

15. The computer-accessible medium of claim 1, wherein the computer arrangement is further configured to utilize the fault analysis procedure to determine a fault impact value for each of a plurality of candidate partition pins to swap.

16. The computer-accessible medium of claim 15, wherein the fault impact value is based on a cumulative sum of bits corrupted by the candidate partition pins over a set of random test patterns.

17. A method providing or securing split manufacturing of an integrated circuit ("IC"), comprising:
  receiving information related to a design of the IC;
  determining at least one first partition pin in the design located at a first location and at least one second partition pin in the design located at a second location to be swapped based on a fault analysis procedure that identifies at least one IC output, wherein the at least one first partition pin and the at least one second partition pin are interconnected with one another based on at least one metal layer; and
  using a computer hardware arrangement, swapping the at least one first partition pin with the at least one second partition pin in the design.

18. The method of claim 17, further comprising determining the second location using an iterative procedure.

19. The method of claim 18, wherein the iterative procedure comprises a greedy iterative procedure.

20. The method of claim 17, further comprising, determining a fault impact value for each of a plurality of candidate partition pins to swap using the fault analysis procedure.

21. The method of claim 20, wherein the fault impact value is based on a cumulative sum of bits corrupted by the candidate partition pins over a set of random test patterns.

22. An integrated circuit (IC), comprising:
  at least one first partition pin provided in the IC whose location has been swapped with at least one second partition pin provided in the IC based on a fault analysis procedure that identifies at least one IC output affected by the swap, wherein the at least one first partition pin and the at least one second partition pin are interconnected with one another based on at least one metal layer.

23. The IC of claim 22, wherein the fault analysis procedure is used to determine a fault impact value for each of a plurality of candidate partition pins to swap.

24. The IC of claim 23, wherein the fault impact value is based on a cumulative sum of bits corrupted by the candidate partition pins over a set of random test patterns.

* * * * *